United States Patent
Chapman et al.

(10) Patent No.: US 9,046,190 B1
(45) Date of Patent: *Jun. 2, 2015

(54) BLOCK AND BLEED VALVE WITH A MAGNETIC COUPLED SWITCH

(75) Inventors: Brian Chapman, Broken Arrow, OK (US); Kenny McDannald, Broken Arrow, OK (US)

(73) Assignee: KENCO INTERNATIONAL, INC., Tulsa, OK (US)

(*) Notice: Subject to any disclaimer, the term of this patent is extended or adjusted under 35 U.S.C. 154(b) by 281 days.

This patent is subject to a terminal disclaimer.

(21) Appl. No.: 13/546,230

(22) Filed: Jul. 11, 2012

Related U.S. Application Data

(63) Continuation-in-part of application No. 13/360,358, filed on Jan. 27, 2012, now Pat. No. 8,564,390.

(60) Provisional application No. 61/453,725, filed on Mar. 17, 2011.

(51) Int. Cl.
| | |
|---|---|
| *F16K 31/18* | (2006.01) |
| *F16K 31/12* | (2006.01) |
| *F16K 31/36* | (2006.01) |
| *F16K 31/24* | (2006.01) |
| *F16K 31/34* | (2006.01) |

(52) U.S. Cl.
CPC *F16K 31/24* (2013.01); *F16K 31/34* (2013.01)

(58) Field of Classification Search
CPC ......... F16K 31/34; F16K 31/18; F16K 31/26; F16K 21/185; F16K 31/24; F16K 31/265
USPC .............. 137/414, 428, 434, 445, 448, 489.5; 335/205–207, 185–189, 177, 179
See application file for complete search history.

(56) References Cited

U.S. PATENT DOCUMENTS

| | | | | |
|---|---|---|---|---|
| 2,893,427 | A | * | 7/1959 | Felgate .................... 137/625.27 |
| 3,822,933 | A | * | 7/1974 | Johnson .......................... 251/65 |
| 3,970,099 | A | * | 7/1976 | Murphy et al. ........... 137/101.25 |
| 4,573,489 | A | * | 3/1986 | Carlton et al. ................... 137/59 |
| 4,577,657 | A | * | 3/1986 | Alexander ..................... 137/448 |
| 5,080,126 | A | * | 1/1992 | De Rycke et al. ............ 137/209 |
| 5,191,912 | A | * | 3/1993 | McDaniel ..................... 137/413 |
| 5,533,545 | A | * | 7/1996 | Robinson ...................... 137/195 |

* cited by examiner

*Primary Examiner* — Craig Schneider
*Assistant Examiner* — Hailey K Do
(74) *Attorney, Agent, or Firm* — Head, Johnson & Kachigian, P.C.

(57) ABSTRACT

A valve assembly having a body, a float assembly, a switch magnet, and a sealing surface that opens or closes a block and bleed valve in response to movement of the float assembly. The float assembly may be pivotally attached to the body at a pivot axis. The float assembly may have a first end and a second end opposite the first end, where the pivot axis is located between the first end and the second end. The float assembly may further comprise a float attached to the first end and a float magnet attached to the second end, such that raising the float causes the float magnet to lower and lowering the float causes the float magnet to rise. The switch magnet may be responsive to movement of the float magnet, and the sealing surface may be responsive to movement of the switch magnet.

14 Claims, 4 Drawing Sheets

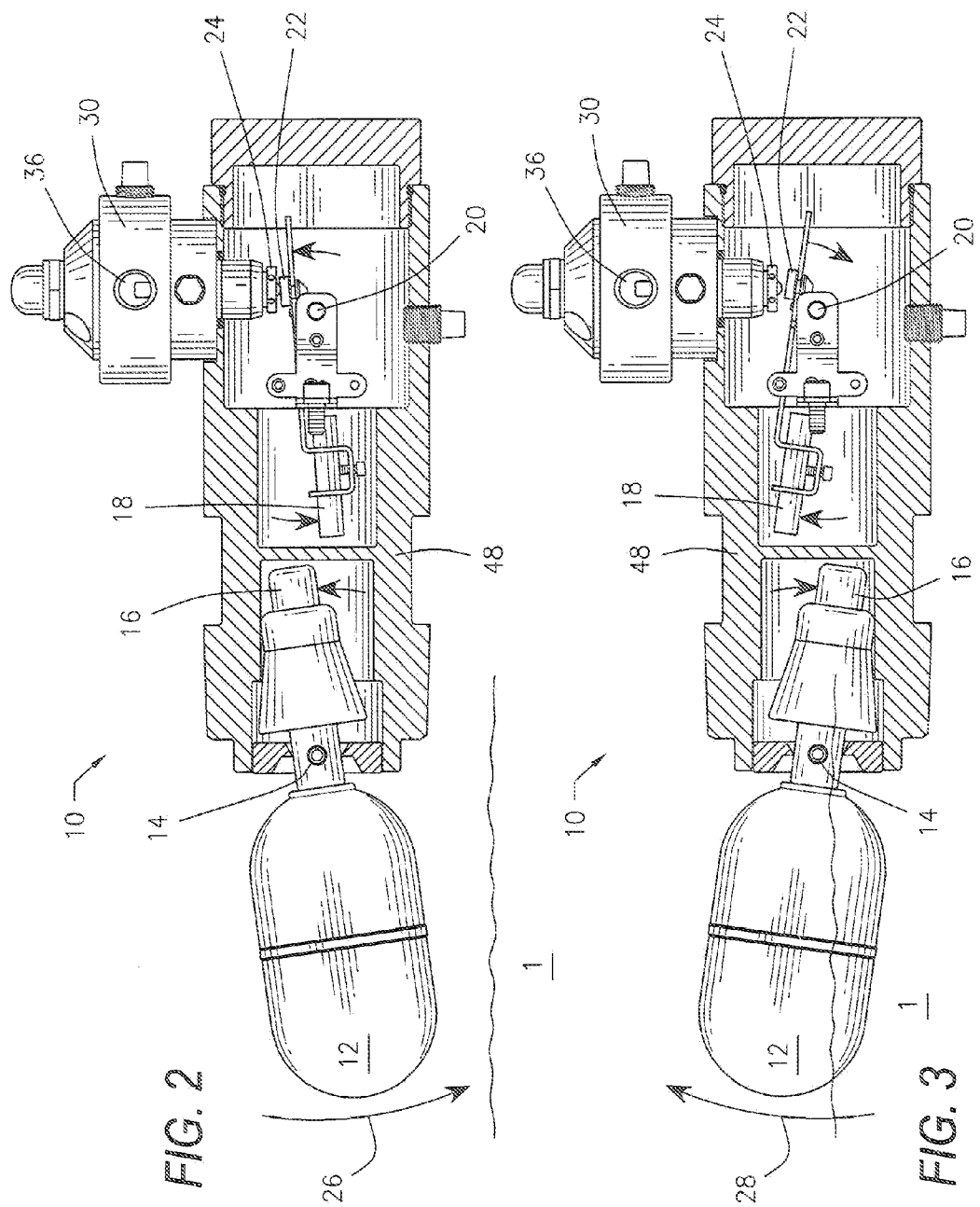

BLOCK AND BLEED VALVE WITH A MAGNETIC COUPLED SWITCH

CROSS REFERENCE

This application is based on and claims priority to U.S. utility patent application Ser. No. 13/360,358, which was filed on Jan. 27, 2012 and which was based on and claimed priority to U.S. Provisional Patent Application Ser. No. 61/453,725, which was filed on Mar. 17, 2011.

BACKGROUND OF THE INVENTION

1. Field of the Invention

The present invention relates to a block and bleed valve with a magnetic coupled switch for a pneumatic operated liquid level switch for tanks and vessels.

2. Description of the Related Art

There are a number of existing devices that include float operated valves. In each case, when the liquid level rises or falls in a tank or vessel, a float shifts a pneumatic valve to one of two positions. Some existing devices couple the float to the pneumatic valve using a magnet couple while others use mechanical linkage.

Some existing devices use a block and bleed valve that is mechanically coupled to the float. The mechanical linkage complicates the use of a snap switch. The mechanical linkage requires a seal between the float and the switch.

Based on the foregoing, it is desirable to provide a float operated pneumatic valve utilizing a magnetically coupled block and bleed valve instead of a mechanically coupled block and bleed valve. This makes the use of a simple and reliable magnetically operated snap acting switch possible. The snap acting switch actuates the block and bleed valve. Since the snap acting switch is magnetically coupled to the float, no seals between the float compartment and the switch compartment are needed.

Some existing pneumatic conical or tapered valves with a magnetic switch are direct acting, such as seen in Felgote (U.S. Pat. No. 2,893,427). It is desirable to provide a magnetic opposing pole snap switch with a block and bleed valve arrangement.

It would also be desirable to provide a block and bleed valve on a float operated pneumatic valve assembly wherein a block and bleed valve is externally adjustable.

SUMMARY OF THE INVENTION

In general, in a first aspect, the invention relates to a valve assembly comprising: a body; a float assembly pivotally attached to the body at a pivot axis; a switch magnet responsive to movement of the float magnet; and a sealing surface responsive to movement of the switch magnet. The float assembly may comprise: a first end; a second end opposite the first end, where the pivot axis is located between the first end and the second end; a float attached to the first end; and a float magnet attached to the second end, such that raising the float causes the float magnet to lower and lowering the float causes the float magnet to rise. The valve assembly may further comprise a block and bleed valve controlled by the sealing surface.

The operation of the magnetically coupled switch and the block and bleed valve are described herein with the float in either the raised or lowered position. This is a non-limiting example, with the magnetically coupled switch configured to operate as described. The magnetically coupled switch could just as easily be configured to operate these events with the float position opposite of what is stated for each event.

In a preferred configuration, the block and bleed valve may comprise: a bleed port cavity in fluid communication with the atmosphere via a bleed port seat, where the sealing surface presses against the bleed port seat blocking access between the bleed port cavity and the atmosphere when the float is lowered and where the sealing surface does not press against the bleed port seat allowing access between the bleed port cavity and the atmosphere when the float is raised; an orifice cavity in fluid communication with the bleed port cavity via an orifice; an inlet port in fluid communication with the orifice cavity; an outlet port in fluid communication with the inlet port via an inlet seat; and a diaphragm located between the bleed port cavity and the inlet seat, such that the diaphragm presses against the inlet seat blocking access between the inlet port and the outlet port when pressure in the bleed port cavity and the inlet port is equal but does not press against the inlet seat allowing access between the inlet port and the outlet port when pressure in the bleed port cavity is less than pressure in the inlet port. The block and bleed valve may further comprise an exhaust port in fluid communication with the outlet port via an exhaust seat and a plug located adjacent the exhaust seat such that the plug presses against the exhaust seat blocking access between the outlet port and the exhaust port when the float is raised but does not press against the exhaust seat allowing access between the outlet port and the exhaust port when the float is lowered. The block and bleed valve may be a pneumatic valve.

The switch magnet may be responsive to movement of the float magnet such that lowering the float magnet causes the switch magnet to rise and raising the float magnet causes the switch magnet to lower. The sealing surface may be responsive to movement of the switch magnet such that raising the switch magnet causes the sealing surface to lower and lowering the switch magnet causes the sealing surface to rise. Raising the float may cause the sealing surface to lower and lowering the float may cause the sealing surface to rise. The switch magnet may be housed within the body.

In a second embodiment, the valve assembly may comprise: a body; a float assembly pivotally attached to the body at a pivot axis, the float assembly comprising: a first end; a second end opposite the first end, where the pivot axis is located between the first end and the second end; a float attached to the first end; and a float magnet attached to the second end, such that raising the float causes the float magnet to lower and lowering the float causes the float magnet to rise; a switch magnet assembly pivotally attached to the body via a pivot shaft, the switch magnet assembly comprising: a first end; a second end opposite the first end, where the pivot shaft is located between the first end and the second end; a switch magnet attached to the first end and located proximate the float magnet, where the switch magnet and the float magnet have like poles such that they repel each other; and a block and bleed valve comprising a sealing surface, where the sealing surface is attached to the second end of the switch magnet assembly.

The switch magnet assembly may be housed within the body. The block and bleed valve may have a seat assembly that is externally adjustable. The block and bleed valve may be a pneumatic valve. The block and bleed valve may comprise: a bleed port cavity in fluid communication with the atmosphere via a bleed port seat, where the sealing surface presses against the bleed port seat blocking access between the bleed port cavity and the atmosphere when the float is lowered and where the sealing surface does not press against the bleed port seat allowing access between the bleed port cavity and the atmosphere when the float is raised; an orifice cavity in fluid communication with the bleed port cavity via an orifice; an inlet port in fluid communication with the orifice cavity; an outlet port in fluid communication with the inlet port via an inlet seat; and a diaphragm located between the bleed port cavity and the inlet seat, such that the diaphragm presses against the inlet seat blocking access between the inlet port and the outlet port when pressure in the bleed port cavity and the inlet port is equal but does not press against the inlet seat allowing access between the inlet port and the outlet port when pressure in the bleed port cavity is less than pressure in the inlet port. The block and bleed valve may further comprise: an exhaust port in fluid communication with the outlet port via an exhaust seat; and a plug located adjacent the exhaust seat such that the plug presses against the exhaust seat blocking access between the outlet port and the exhaust port when the float is raised but does not press against the exhaust seat allowing access between the outlet port and the exhaust port when the float is lowered.

BRIEF DESCRIPTION OF THE DRAWINGS

FIG. 2 is a side view of the pneumatic operated liquid level switch assembly shown in FIG. 1 with the float in a lowered position;

FIG. 3 is a side view of the pneumatic operated liquid level switch assembly shown in FIG. 1 with the float in a raised position;

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the present invention relates to a pneumatic operated liquid level switch assembly 10 for tanks and vessels used in a wide variety of industrial applications.

Figure 1:
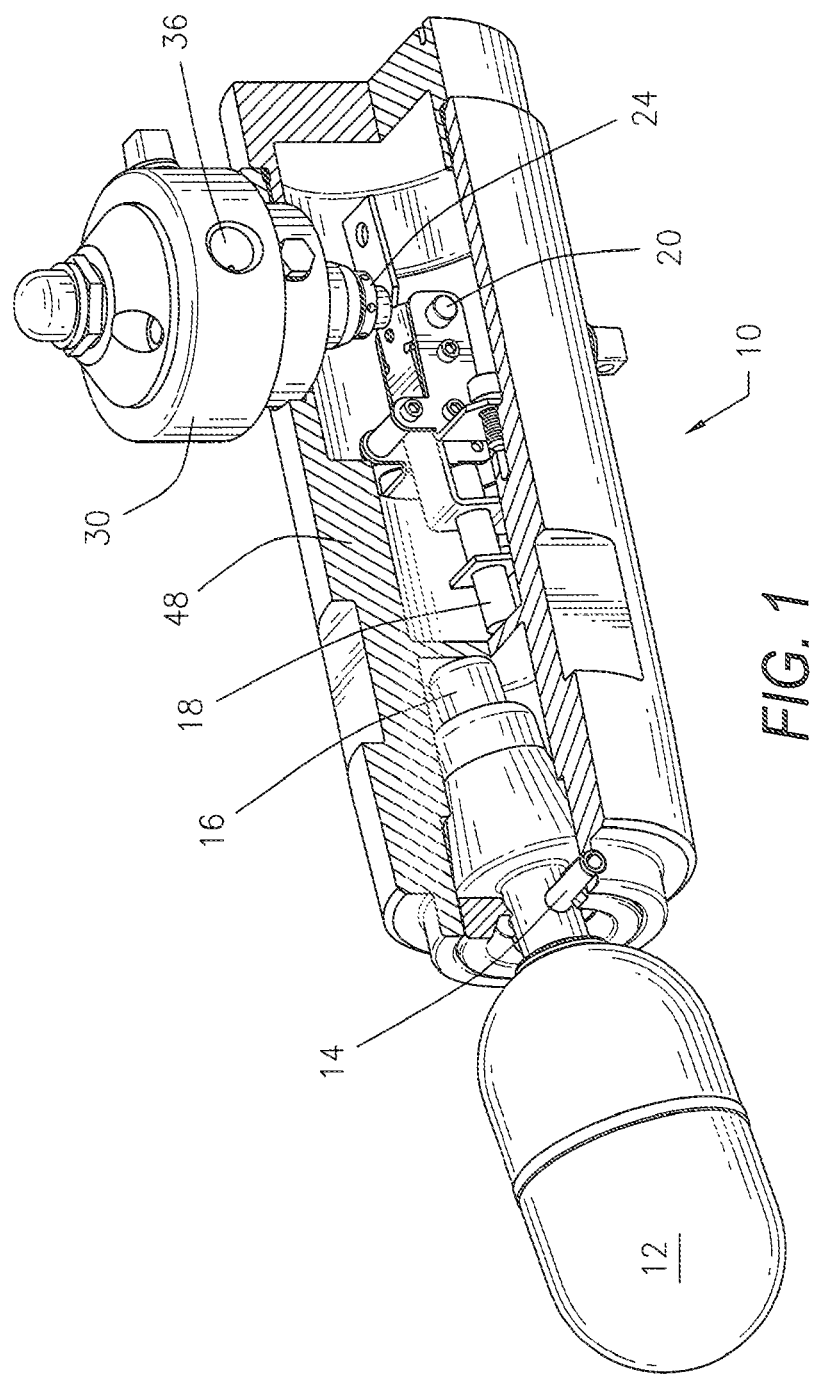
FIG. 1 is a perspective view of a pneumatic operated liquid level switch assembly constructed in accordance with the present invention.
Figure 4:
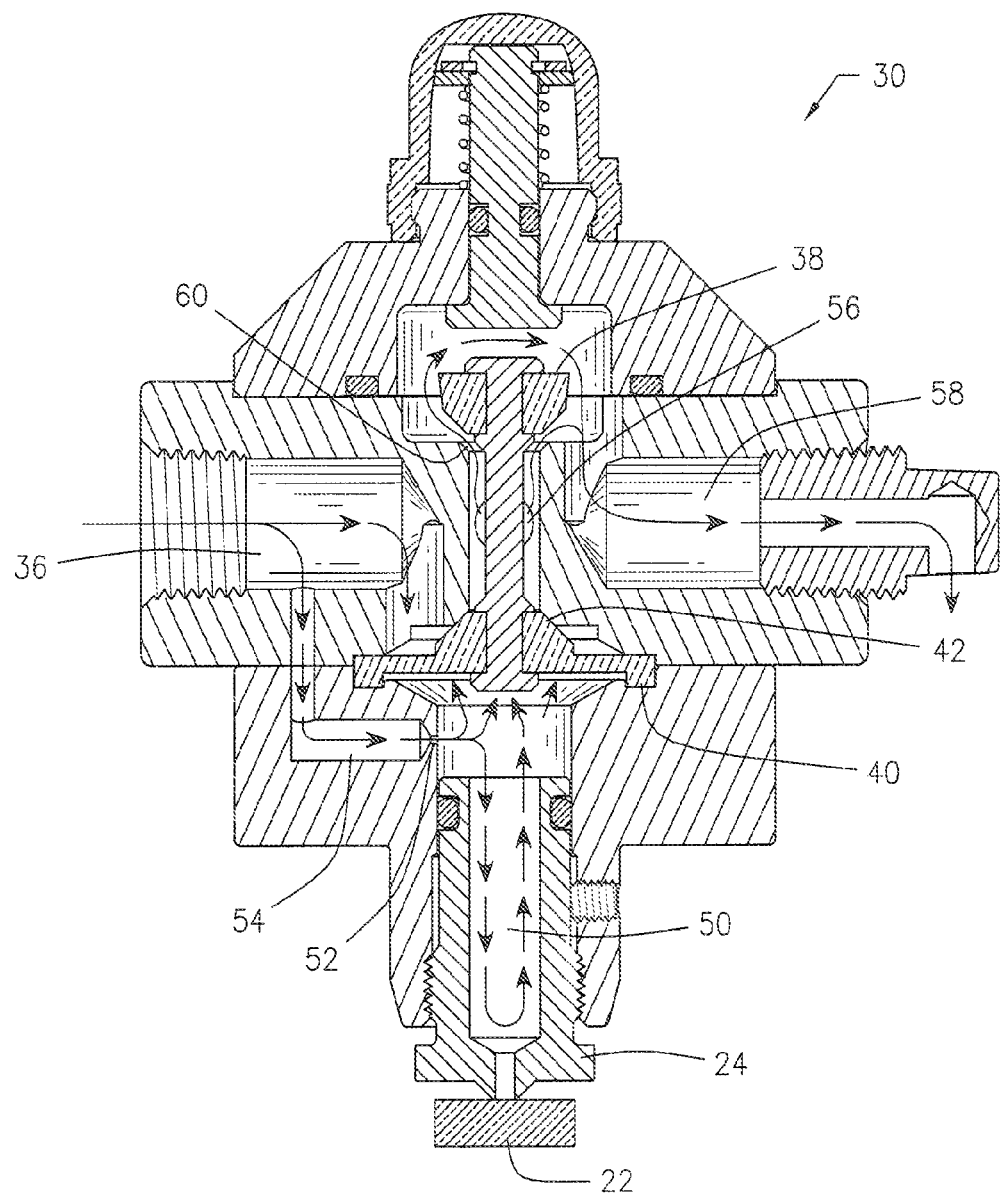
FIG. 4 is a cut-away view of a block and bleed valve assembly in a closed position.

As seen in FIGS. 1 through 3, a float 12 may be in fluid communication with liquid 1 in a tank or vessel (not shown) and will move down when the liquid level decreases, as shown by arrow 26, or up when the liquid level increases, as shown by arrow 28. The float 12 may pivot around a pivot axis 14. At the opposite end of the pivot axis 14 may be a float magnet 16. Movement of the float 12 may result in reciprocal movement of the float magnet 16. The switch 10 may include a switch body 48 near the float magnet 16. Within the switch body 48 may be a switch magnet 18, which generates repelling magnet forces. The switch magnet 18 may revolve around a pivot shaft 20 to move a sealing surface 22, which may be part of a block and bleed valve assembly 30. In a preferred configuration, the sealing surface may be a flat elastomeric pad The block and bleed valve assembly 30, shown in a cut-away view in FIGS. 4 and 5, may be a pneumatic valve assembly, and may be a two position three-way valve. The valve 30 may be operated by either blocking a bleed port 50 or opening the bleed port 50 via a bleed port seat 24. With the bleed port seat 24 blocked by the pad 22, as shown in FIG. 4, the valve 30 may shift to a closed state in which an inlet port 36 is blocked and an outlet port 56 is open to an exhaust port 58. If the bleed port seat 24 is opened or unblocked, as shown in FIG. 5, the valve 30 may shift to an open state in which the inlet port 36 is open to the outlet port 56 and the exhaust port 58 is closed.

The bleed port 50 may be in fluid communication via an orifice 52 with an orifice cavity 54. The orifice cavity 54 may likewise be in fluid communication with the inlet port 36. A diaphragm 40 may be located adjacent the bleed port 50, and also adjacent an inlet seat 42, such that the diaphragm 40 presses against the inlet seat 42 when the valve is closed and is spaced away from the inlet seat 42 when the valve is open. When open, the inlet port 36 may be in fluid communication with the outlet port 56 via the space between the diaphragm 40 and the inlet seat 42. The outlet port 56 may be in fluid communication with the exhaust port 58 when the valve is closed, but a plug 38 may press against an exhaust seat 60, blocking the path between the outlet port 56 and the exhaust port 58, when the valve is open.

FIG. 4 shows the valve 30 in a closed position. In this position, inlet gas may travel as shown by the arrows through the inlet port 36 and may pressurize the top of the diaphragm 40, the orifice cavity 54, and the bleed port cavity 50. Because the bleed port cavity 50 is blocked, the pressure in the inlet port 36, orifice cavity 54, and bleed port cavity 50 all reach equilibrium. Just as the top of the diaphragm 40 is subjected to the pressure in the inlet port 36, the bottom of the diaphragm 40 is subject to the pressure in the bleed port cavity 50. If the pressure is equalized, the pressure on the top of the diaphragm 40 is the same as the pressure on the bottom of the diaphragm 40. Since the area of the diaphragm 40 facing the bleed port cavity 50 (the bottom of the diaphragm 40) is larger than the area of the diaphragm 40 facing the inlet port 36 (the top of the diaphragm 40), the resultant force from the equalized pressure pushes the diaphragm 40 up against the inlet seat 42. As the diaphragm 40 moves up against the inlet seat 42, closing it off, it also pushes the plug 38 off of the exhaust seat 60. With the inlet seat 42 closed by the diaphragm 40, the inlet gas is blocked. With the plug 38 lifted off of the exhaust seat 60, the outlet port 56 opens to the exhaust port 58 allowing any gas in the outlet port 56 to escape through to the exhaust port 58. As long as the bleed port seat 24 stays blocked by the pad 22, the valve 30 will remain in this closed state.

Figure 5:
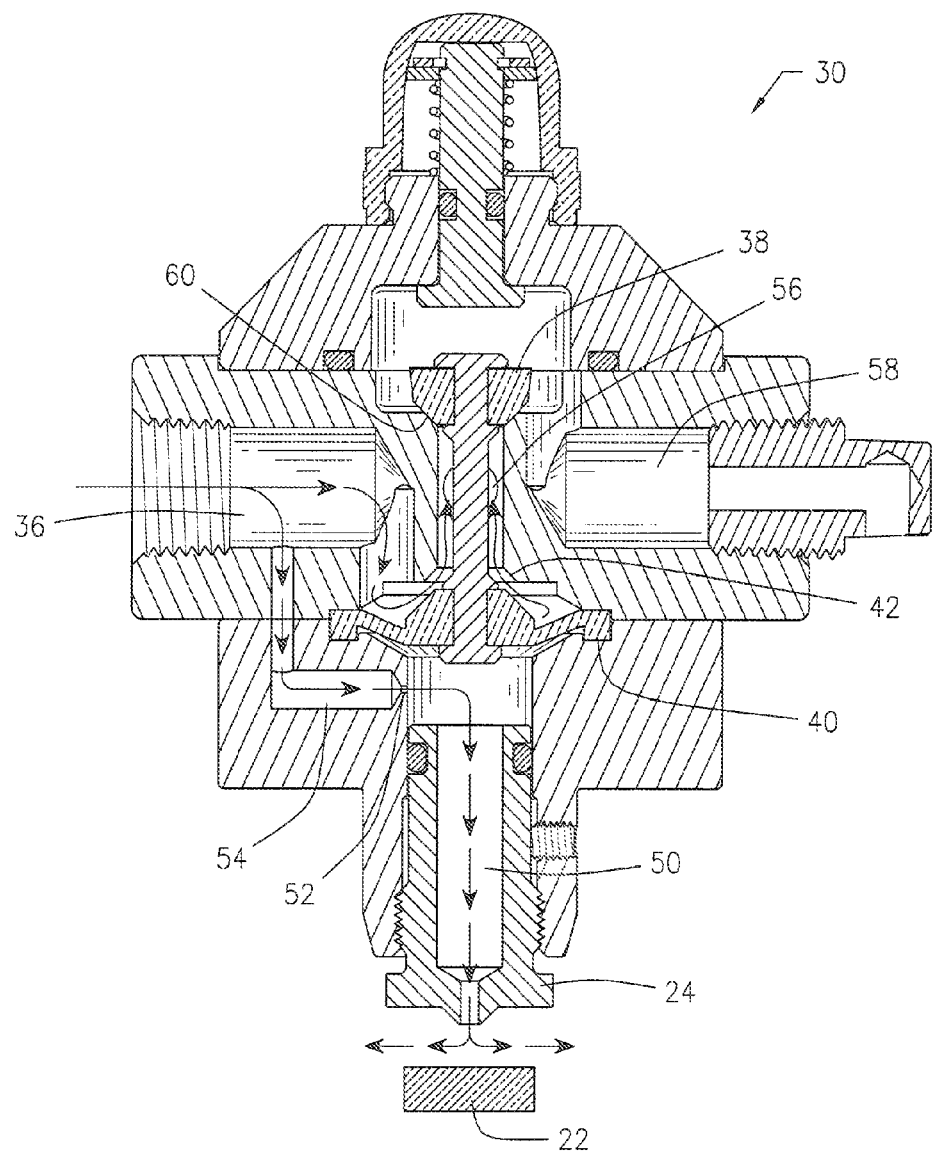
FIG. 5 is a cut-away view of a block and bleed valve assembly in an open position.

FIG. 5 shows the valve 30 in an open position. In this position, the inlet gas travels as shown by the arrows through the inlet port 36 and pressurizes the top of the diaphragm 40 and the orifice cavity 54. The inlet gas travels across the orifice 52 in the orifice cavity 54 and exits the valve 30 through the unblocked (open) bleed port 50. Because the area of the orifice 52 is much less than the area of the bleed port 50, there is a pressure drop in the gas as it travels across the orifice 52 and into the bleed port cavity 50. Because the bleed port 50 is unblocked and open to atmosphere, there is a pressure drop across the orifice 52 and pressure does not build up in the bleed port cavity 50. This results in the area of the diaphragm 40 facing the bleed port cavity 50 (the bottom of the diaphragm 40) not being pressurized. Since the bottom of the diaphragm 40 is not pressurized but the top is, the resulting force pushes the diaphragm 40 off of the inlet seat 42. The force of the pressurized gas on the top of the diaphragm 40 continues to push the diaphragm 40 down until the plug 38 comes in contact with the exhaust seat 60, closing it off. With the inlet seat 42 open, the inlet gas travels through the inlet seat 42 and into the outlet port 56. Since the exhaust seat 60 is closed off by the plug 38, the inlet gas cannot escape out of the exhaust port 58. As long as the bleed port 50 stays open, the valve 30 will remain in this open state.

Whereas, the devices and methods have been described in relation to the drawings and claims, it should be understood that other and further modifications, apart from those shown or suggested herein, may be made within the spirit and scope of this invention.

What is claimed is:

1. A valve assembly comprising:
    a body;
    a float assembly pivotally attached to the body at a pivot axis, the float assembly comprising:
        a first end;
        a second end opposite the first end, where the pivot axis is located between the first end and the second end;
        a float attached to the first end; and
        a float magnet attached to the second end, such that raising the float causes the float magnet to lower and lowering the float causes the float magnet to rise;
    a switch magnet responsive to movement of the float magnet, where the switch magnet and the float magnet have like poles such that they repel each other and where the switch magnet is responsive to movement of the float magnet such that lowering the float magnet causes the switch magnet to rise and raising the float magnet causes the switch magnet to lower;
    a sealing surface responsive to movement of the switch magnet; and
    a block and bleed valve pneumatically controlled by the sealing surface, where the sealing surface presses against a bleed port seat thereby blocking access to a bleed port cavity in a valve seat assembly.

2. The valve assembly of claim 1 wherein the sealing surface is an elastomeric pad.

3. The valve assembly of claim 1 where the sealing surface is responsive to movement of the switch magnet such that raising the switch magnet causes the sealing surface to lower and lowering the switch magnet causes the sealing surface to rise.

4. The valve assembly of claim 1 where the switch magnet is housed within the body.

5. The valve assembly of claim 1 where the block and bleed valve comprises:
    a bleed port cavity in fluid communication with the atmosphere via a bleed port seat, where the sealing surface presses against the bleed port seat blocking access between the bleed port cavity and the atmosphere when the float is lowered and where the sealing surface does not press against the bleed port seat allowing access between the bleed port cavity and the atmosphere when the float is raised;
    an orifice cavity in fluid communication with the bleed port cavity via an orifice;
    an inlet port in fluid communication with the orifice cavity;
    an outlet port in fluid communication with the inlet port via an inlet seat; and
    a diaphragm located between the bleed port cavity and the inlet seat, such that the diaphragm presses against the inlet seat blocking access between the inlet port and the outlet port when pressure in the bleed port cavity and the inlet port is equal but does not press against the inlet seat allowing access between the inlet port and the outlet port when pressure in the bleed port cavity is less than pressure in the inlet port.

6. The valve assembly of claim 5 where the block and bleed valve further comprises:
    an exhaust port in fluid communication with the outlet port via an exhaust seat; and
    a plug located adjacent the exhaust seat such that the plug presses against the exhaust seat blocking access between the outlet port and the exhaust port when the float is raised but does not press against the exhaust seat allowing access between the outlet port and the exhaust port when the float is lowered.

7. A valve assembly comprising:
    a body;
    a float assembly pivotally attached to the body at a pivot axis, the float assembly comprising:
        a first end;
        a second end opposite the first end, where the pivot axis is located between the first end and the second end;
        a float attached to the first end; and
        a float magnet attached to the second end, such that raising the float causes the float magnet to lower and lowering the float causes the float magnet to rise;
    a switch magnet assembly pivotally attached to the body via a pivot shaft, the switch magnet assembly comprising:
        a first end;
        a second end opposite the first end, where the pivot shaft is located between the first end and the second end;
        a switch magnet attached to the first end and located proximate the float magnet, where the switch magnet and the float magnet have like poles such that they repel each other and wherein the switch magnet is responsive to movement of the float magnet such that lowering the float magnet causes the switch magnet to rise and raising the float magnet causes the switch magnet to lower; and
    a pneumatic block and bleed valve comprising a sealing surface and a bleed port cavity, where the sealing surface is attached to the second end of the switch magnet assembly and presses against a bleed port seat thereby blocking access to a bleed port cavity in a valve seat assembly.

8. The valve assembly of claim 7 where the switch magnet assembly is housed within the body.

9. The valve assembly of claim 7 where the block and bleed valve has a seat assembly that is externally adjustable.

10. The valve assembly of claim 7 wherein the sealing surface is an elastomeric pad.

11. The valve assembly of claim 7 where the block and bleed valve comprises:
    a bleed port cavity in fluid communication with the atmosphere via a bleed port seat, where the sealing surface presses against the bleed port seat blocking access between the bleed port cavity and the atmosphere when the float is lowered and where the sealing surface does not press against the bleed port seat allowing access between the bleed port cavity and the atmosphere when the float is raised;
    an orifice cavity in fluid communication with the bleed port cavity via an orifice;
    an inlet port in fluid communication with the orifice cavity;
    an outlet port in fluid communication with the inlet port via an inlet seat; and
    a diaphragm located between the bleed port cavity and the inlet seat, such that the diaphragm presses against the inlet seat blocking access between the inlet port and the outlet port when pressure in the bleed port cavity and the inlet port is equal but does not press against the inlet seat allowing access between the inlet port and the outlet port when pressure in the bleed port cavity is less than pressure in the inlet port.

12. The valve assembly of claim 11 where the block and bleed valve further comprises:
   an exhaust port in fluid communication with the outlet port via an exhaust seat; and
   a plug located adjacent the exhaust seat such that the plug presses against the exhaust seat blocking access between the outlet port and the exhaust port when the float is raised but does not press against the exhaust seat allowing access between the outlet port and the exhaust port when the float is lowered.

13. A valve assembly comprising:
   a body;
   a float assembly pivotally attached to the body at a pivot axis, the float assembly comprising:
      a first end;
      a second end opposite the first end, where the pivot axis is located between the first end and the second end;
      a float attached to the first end; and
      a float magnet attached to the second end, such that raising the float causes the float magnet to lower and lowering the float causes the float magnet to rise;
   a switch magnet responsive to movement of the float magnet, where the switch magnet and the float magnet have like poles such that they repel each other;
   a sealing surface responsive to movement of the switch magnet where raising the float causes the sealing surface to lower and lowering the float causes the sealing surface to rise; and
   a block and bleed valve pneumatically controlled by the sealing surface, where the sealing surface presses against a bleed port seat thereby blocking access to a bleed port cavity in a valve seat assembly.

14. A valve assembly as set forth in claim 13 wherein the sealing surface is an elastomeric pad.

* * * * *